(12) United States Patent
Jensvold

(10) Patent No.: US 7,578,871 B2
(45) Date of Patent: Aug. 25, 2009

(54) GAS SEPARATION MEMBRANE WITH PARTIAL SURFACTANT COATING

(75) Inventor: John A. Jensvold, Benicia, CA (US)

(73) Assignee: Generon IGS, Inc., Houston, TX (US)

( * ) Notice: Subject to any disclaimer, the term of this patent is extended or adjusted under 35 U.S.C. 154(b) by 377 days.

(21) Appl. No.: 11/137,827

(22) Filed: May 25, 2005

(65) Prior Publication Data

US 2006/0266217 A1 Nov. 30, 2006

(51) Int. Cl.
*B01D 59/12* (2006.01)
*B01D 29/00* (2006.01)

(52) U.S. Cl. .......................................... 96/8; 210/490
(58) Field of Classification Search ............... 96/8; 210/490

See application file for complete search history.

(56) References Cited

U.S. PATENT DOCUMENTS

| | | | |
|---|---|---|---|
| 5,141,530 A | 8/1992 | Jensvold | |
| 5,163,977 A | 11/1992 | Jensvold | |
| 6,136,073 A * | 10/2000 | Coan et al. | 96/8 |
| 6,180,168 B1 | 1/2001 | Stookey | |
| 6,688,477 B2 * | 2/2004 | Kalthod | 210/490 |
| 6,746,513 B2 * | 6/2004 | Anderson | 95/45 |
| 6,776,820 B2 * | 8/2004 | Bikson et al. | 95/52 |
| 2002/0162455 A1 * | 11/2002 | Bikson et al. | 96/8 |

* cited by examiner

*Primary Examiner*—Walter D Griffin
*Assistant Examiner*—Amber Orlando
(74) *Attorney, Agent, or Firm*—William H. Eilberg

(57) ABSTRACT

A gas separation module includes fibers formed of a membrane which exhibits selectivity between gaseous components to be separated. The fibers are partially coated with a solution which enhances their selectivity, the fibers being uncoated in the vicinity of their feed ends. The partially coated fibers provide a good compromise between the goals of improved selectivity and enhanced product flow. The gaseous component that permeates through the membrane is made to flow in a direction opposite that of the main gas feed, due to a baffle that directs the permeate in the desired direction. The invention also includes a method and apparatus for making the partially coated module.

6 Claims, 2 Drawing Sheets

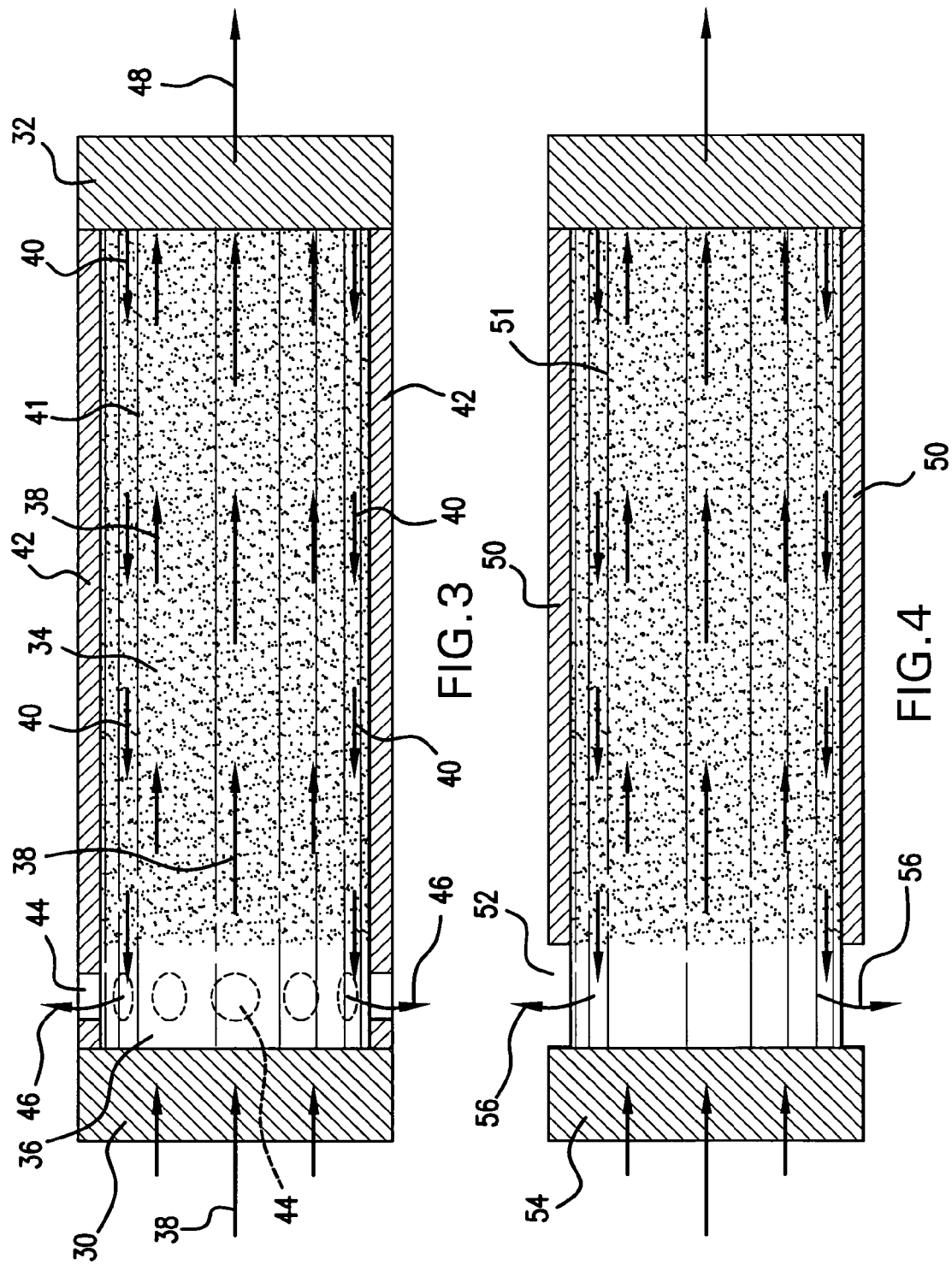

GAS SEPARATION MEMBRANE WITH PARTIAL SURFACTANT COATING

BACKGROUND OF THE INVENTION

The present invention relates to the field of non-cryogenic separation of gases into components, and provides a partially coated membrane which enhances the efficiency of the gas separation process.

It has been known to use a polymeric membrane to separate air into components. Various polymers have the property that they allow different gases to flow through, or permeate, the membrane, at different rates. A polymer used in air separation, for example, will pass oxygen and nitrogen at different rates. The gas that preferentially flows through the membrane wall is called the "permeate" gas, and the gas that tends not to flow through the membrane is called the "non-permeate" gas. The selectivity of the membrane is a measure of the degree to which the membrane allows one component, but not the other, to pass through.

A membrane-based gas separation system has the inherent advantage that the system does not require the transportation, storage, and handling of cryogenic liquids. Also, a membrane system requires relatively little energy. The membrane itself has no moving parts; the only moving part in the overall membrane system is usually the compressor which provides the gas to be fed to the membrane.

A gas separation membrane unit is typically provided in the form of a module containing a large number of small, hollow fibers made of the selected polymeric membrane material. The module is generally cylindrical, and terminates in a pair of tubesheets which anchor the hollow fibers. The tubesheets are impervious to gas. The fibers are mounted so as to extend through the tubesheets, so that gas flowing through the interior of the fibers (known in the art as the bore side) can effectively bypass the tubesheets. But gas flowing in the region external to the fibers (known as the shell side) cannot pass through the tubesheets.

In operation, a gas is introduced into a membrane module, the gas being directed to flow through the bore side of the fibers. One component of the gas permeates through the fiber walls, and emerges on the shell side of the fibers, while the other, non-permeate, component tends to flow straight through the bores of the fibers. The non-permeate component comprises a product stream that emerges from the bore sides of the fibers at the outlet end of the module.

The effectiveness of a membrane in gas separation depends not only on the inherent selectivity of the membrane, but also on its capability of handling a sufficiently large product flow. Gas permeates through the membrane due to the pressure differential between one side of the membrane and the other. Thus, to maintain the pressure differential, it is advantageous to remove the permeate gas from the vicinity of the fibers, after such gas has emerged on the shell side. Removal of the permeate gas maximizes the partial pressure difference across the membrane, with respect to the permeate gas, along the length of the module, thus improving both the productivity and recovery of the module. In the membrane module of the present invention, the permeate gas is made to flow out of the module in a direction opposite to that of the basic feed stream.

It has been known that certain materials, when coated onto a polymeric membrane, can enhance the selectivity of the membrane with regard to specific types of gases to be separated. U.S. Pat. No. 5,141,530, the disclosure of which is incorporated by reference herein, describes a solution, in water, of a non-ionic surfactant which, when applied to the membrane, improves its selectivity for the separation of air into oxygen and nitrogen, and thereby increases the efficiency of the air separation process. However, coating the membrane reduces the permeability of the membrane, so that while the coated membrane becomes more selective, it also processes less gas than an uncoated membrane.

In the above-cited patent, the entire lengths of the membrane fibers in the module are coated, so as to provide more selectivity. But although the product recovery is improved, the product flow rate is reduced, thus impairing the utility of the system. If one used, instead, an uncoated module, the product flow would be improved, but the product recovery would be reduced. Also, an uncoated module will produce a higher pressure drop, along the length of the fiber, as compared with a coated module.

The present invention provides a gas separation membrane module which maximizes the product recovery of the module, but which minimizes the pressure drop along the length of the module, for a given product flow. The module of the present invention therefore enjoys advantages of both a coated and an uncoated module, and combines the best features of both. The invention also includes a method of making the improved module.

SUMMARY OF THE INVENTION

The gas separation module of the present invention comprises a plurality of hollow fibers, extending from a first tubesheet at the feed end of the module, to a second tubesheet at the product end of the module. The fibers are formed of a membrane which exhibits selectivity between gaseous components to be separated from a feed stream. The fibers are partially coated with a solution which improves the selectivity of the membrane, the fibers being uncoated in the vicinity of the feed end. In one preferred embodiment, the fibers may be coated along approximately three-quarters of their length.

In the module of the present invention, the permeate gas, which permeates through the walls of the fibers, flows out of the module in a direction opposite to that of the main gas feed, due to the effect of a baffle which allows the permeate gas to exit the module only in the vicinity of the feed end.

In one embodiment, the baffle extends from one tubesheet to the other, and the permeate gas escapes through openings formed in the baffle near the feed end. In another embodiment, the baffle does not extend all the way to the first tubesheet, leaving a gap between the first tubesheet and the baffle. The permeate gas escapes through this gap.

The invention also includes an apparatus for making the partially coated module. The apparatus includes a module as described above, and a reservoir, the module and the reservoir being linked by a valved conduit. The module is mounted vertically with its product end facing down, and the reservoir is filled with a solution which, when coated onto the fibers of the module, enhances their selectivity. When the solution is allowed to flow freely, by gravity, between the reservoir and the module, the liquid levels in the reservoir and the module become equal. The vertical position of the reservoir is adjusted so as to adjust the degree to which the fibers in the module are submerged. In a preferred embodiment, the fibers are coated along about three-quarters of their length, meaning that about one-quarter of the length of the fibers remains above the surface of the liquid in the module.

The module is connected to a drain valve for draining the solution from the module when the coating operation is complete, and a conduit for directing dry gas through the module, to dry the fibers after coating.

The present invention also includes the method of partially coating the module using the apparatus described above, the coating being performed such that a portion of the fibers of the module remain uncoated near the feed end.

The invention therefore has the primary object of providing a membrane-based gas separation module having improved performance.

The invention has the further object of providing a gas separation module having improved selectivity and improved product flow, while minimizing pressure drop, for a given level of product purity.

The invention has the further object of improving the efficiency of membrane-based gas separation systems.

The invention has the further object of providing an apparatus and method for improving the selectivity of a membrane-based gas separation module.

The reader skilled in the art will recognize other objects and advantages of the present invention, from a reading of the following brief description of the drawings, the detailed description of the invention, and the appended claims.

BRIEF DESCRIPTION OF THE DRAWINGS

FIG. 3 provides a cross-sectional view, partially schematic in nature, showing a gas separation membrane module made according to one embodiment of the present invention.

FIG. 4 provides a view similar to that of FIG. 3, showing another embodiment of the gas separation membrane module of the present invention.

DETAILED DESCRIPTION OF THE INVENTION

The present invention comprises a gas separation module defining a membrane formed as a plurality of hollow fibers, the fibers being partially coated with a material that improves the selectivity of the membrane.

Figure 1:
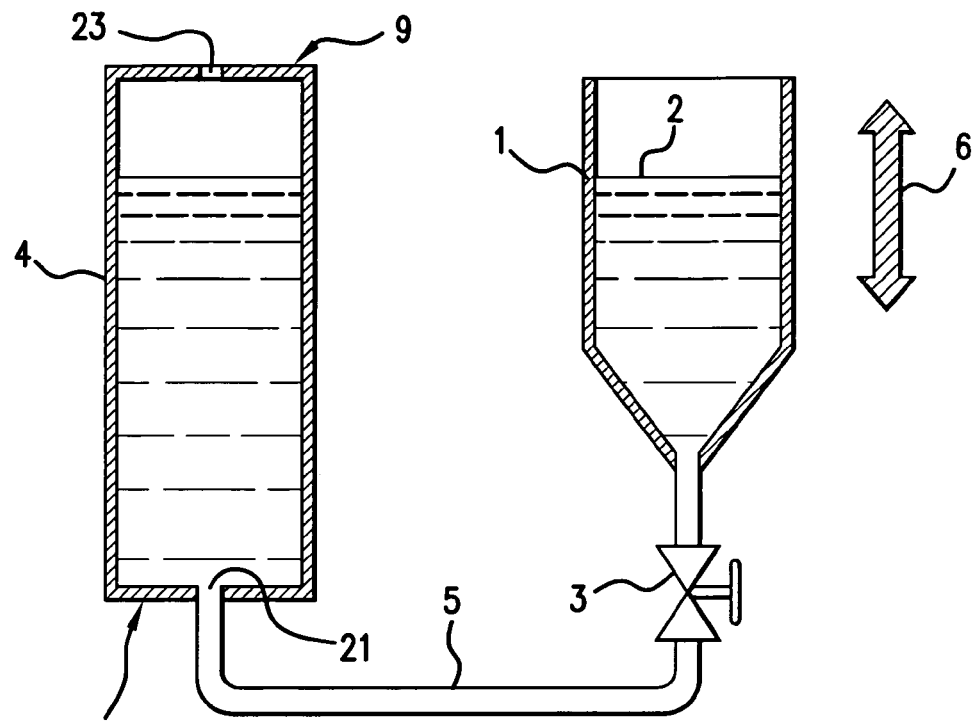
FIG. 1 provides a schematic diagram of an apparatus used to coat a gas separation membrane module according to the present invention.
Figure 2:
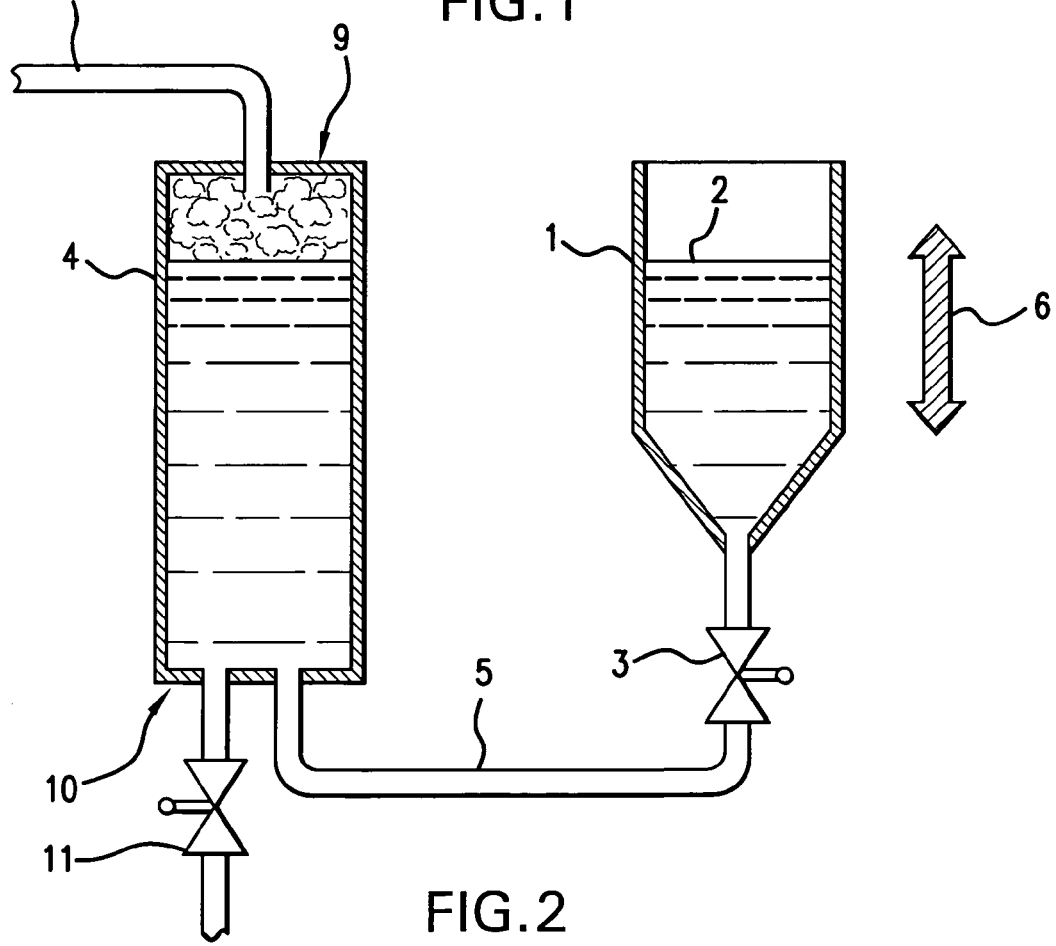
FIG. 2 provides a schematic diagram, showing the apparatus of FIG. 1, and also showing means for drying the module after coating.

FIG. 1 illustrates an apparatus used for performing the partial coating. Reservoir 1 holds solution 2, the solution including a non-ionic surfactant of the type described in U.S. Pat. No. 5,141,530, or any other solution which, when applied to a membrane, improves the selectivity of that membrane with respect to the gaseous components being separated.

Valve 3, when opened, allows solution 2 to flow by gravity, through conduit 5, into membrane module 4. Module 4, which will be described in more detail below, contains a plurality of hollow fibers, extending from the feed end 9 to the product end 10, the fibers being made of a material that exhibits selectivity with respect to the gaseous components to be separated. The feed end is the end at which gas to be separated is introduced into the module. The product end is the end from which a product gas is withdrawn. Thus, when the module is used, gas flows from the feed end to the product end.

The module 4 has tubesheets, at the feed end and the product end, for holding the fibers. The tubesheets will be described in more detail below. The tubesheets both include at least one opening. Opening 21 at the product end allows liquid to flow from reservoir 1. Opening 23 at the feed end provides a vent which allows the liquid levels to become equal. As shown in FIG. 1, the module is oriented vertically, with the product end down.

The degree to which the fibers in the module are coated is determined by the vertical position of the reservoir 1. As indicated by arrow 6, the reservoir is vertically movable, the arrow 6 being intended to represent any means for moving the reservoir up or down. When the valve 3 is opened, and the solution flows into module 4, the liquid level in the reservoir 1 and the liquid level in the module 4 quickly become the same. Thus, the level of liquid in the module 4 can be effectively adjusted, upward or downward, simply by moving the reservoir up or down.

According to the present invention, the portion of the module near the feed end is left uncoated, while the portion near the product end is coated. As used in this specification, the term "coating a module" means coating the fibers of the module. The degree to which the fibers in the module are coated is clearly determined by the level of the solution in the module. Thus, one adjusts the vertical position of the reservoir 1, thereby varying the percentage of the fibers in the module that will be coated. The percentage chosen depends on the performance desired from the module.

If there is no coating at all, the module is likely to have a somewhat higher product flow than a coated module, but with a reduced product recovery (often defined as the ratio of product flow to the required feed flow for a given product purity), as well as a higher pressure drop. If the fiber is coated completely, the result will be higher product recovery, but with a lower product flow. It has been found that coating about three-quarters of the fiber length will provide a good compromise between the above considerations.

After the level of the solution has been adjusted as desired, the liquid level in the module should be maintained for a period of time sufficient to insure complete contact between the solution and the fibers, and to insure uniformity of coating from one fiber to the next. The duration of exposure to the solution may be the same as described in U.S. Pat. No. 5,141,530. When the module has been exposed for a sufficient time, the solution is drained from the module, and dry gas (usually air) is used to dry the module.

To drain the solution from the module, one closes valve 3, and opens valve 11. Thus, the solution drains through the valve 11, and no more solution can flow out of the reservoir 1. The dry gas is delivered to the module through conduit 8. The dry gas is passed from the feed end to the product end of the module, so as to avoid the possibility of unintentionally depositing any residual solution on the feed end of the fibers. The dry gas is made to flow through the system until the module is dry.

FIGS. 3 and 4 illustrate, in schematic form, two embodiments of the module made according to the present invention. In both of these figures, the actual fibers are represented symbolically by horizontal lines such as those indicated by numerals 41 and 51, it being understood that there are many more fibers than can be conveniently illustrated, and that the fibers extend from one tubesheet to the other.

In FIG. 3, the module includes tubesheet 30, located at the feed end, and tubesheet 32 located at the product end. The stippled region 34 represents the region in which the fibers are coated, and the non-stippled region 36 designates the region in which the fibers are not coated. The arrows pointing from left to right, such as arrows 38, indicate the main flow of gas, through the bores of the fibers, from the feed end to the product end. The arrows pointing from right to left, such as arrows 40, indicate the countercurrent flow of permeate gas that has passed through the walls of the fiber. Thus, the gas flowing in the direction indicated by arrows 40 flows on the shell side of the fibers.

The module of FIG. 3 also includes baffle 42, which encloses the module. Due to the fact that the baffle 42 and the tubesheet 32 are substantially impervious to gas, and due to the fact that the baffle abuts the tubesheet 32, the permeate gas on the shell side of the fibers can flow only towards the left, i.e. back towards the feed end, where the gas exits through openings 44 in the baffle, as indicated by arrows 46. The gas flows out because the feed gas is injected under pressure, and the permeate gas which emerges on the shell side of the fibers has nowhere to go but through the openings, due to the barriers defined by the baffle and the tubesheets. The only gas that penetrates the tubesheets is gas flowing inside the hollow fibers which themselves are mounted to, and pass through, the tubesheets. Arrow 48 represents the flow of product gas which has passed through the bores of the fibers and through the tubesheets as described above. The baffle therefore serves as a means for causing countercurrent flow of the permeate gas.

The module represented in FIG. 4 is similar to that of FIG. 3, except that baffle 50 does not extend from one tubesheet to the other. Instead, the baffle defines gap 52, adjacent to tubesheet 54 at the feed end of the module. Permeate gas on the shell side of the fibers therefore exits through this gap, as indicated by arrows 56.

In FIG. 4, the baffle is approximately coextensive with the coated region. However, the baffle could be longer or shorter than the coated region, and there is no inherent correlation between the length of the baffle and the length of the coated region. The present invention is intended to include all of the above possibilities.

The modules made as described above have improved selectivity and improved throughput, relative to gas separation modules of the prior art. The modules of the present invention also minimize the pressure drop along the length of the module, for a given product flow.

In particular, it has been found that the modules of the present invention provide about 10-25% more product flow than modules of the prior art, while still improving product recovery by about 10%, and while minimizing the pressure drop along the length of the modules.

Example

A module, formed of hollow fibers made of tetra-bromo-bis-a polycarbonate (TBBA-PC) was prepared and coated, in varying amounts, with a non-ionic surfactant water-based solution, namely Triton-X 100, having a concentration of 150 ppm. Triton-X is one of the materials used as a coating in U.S. Pat. No. 5,141,530. The initial pressure of the gas injected into the module was 135 psig, at a temperature of 25° C. The module was tested in the uncoated state, and with coatings of 50% and 75% of the fiber length. To coat the fibers, the module was held partially submerged in the solution for four hours. The solution was then drained, and the module was dried for 16 hours with dry air. For each test, the module was operated to produce nitrogen at a purity of 99%, and the following results were obtained for this level of purity.

The following table summarizes the results:

| Coating (%) | Product Flow (scfh) | Product Recovery (%) | Pressure Drop (psi) |
|---|---|---|---|
| 0 | 2042 | 30.7 | 5.7 |
| 50 | 2005 | 31.9 | 4.3 |
| 75 | 1812 | 33.9 | 3.7 |

As shown by the table, the module that was 50% coated exhibited a product flow that was about 2% less, and a relative recovery that was about 4% more, with a pressure drop that was about 25% smaller, as compared with the uncoated module. For the module that was 75% coated, the product flow was reduced by about 11%, and the relative recovery was increased by about 10%, with a pressure drop that was about 35% less, as compared with the uncoated module.

In contrast, in U.S. Pat. No. 5,141,530, the fully-coated modules described in the patent showed reductions of 22-58% in product flow, and relative recovery increases of 5-8%.

The pressure drops typically vary linearly with the product flow, but since a significant amount of the feed flow is permeated near the feed end, in the uncoated part of the fiber, the present invention exhibits a pressure drop decrease of 35%, with a corresponding drop in product flow of only 11%.

The membrane used to make the module of the present invention exhibits selectivity, relative to the gases desired to be separated, even before it is coated. In particular, the selectivity of the uncoated membrane may be about 80% of the selectivity of the coated membrane. Also, the permeability of the coated membrane may be about 50-60% of the permeability of the uncoated membrane. Thus, the present invention comprises partially coating a membrane that is already selective for the gaseous components to be separated.

The invention can be modified in various ways. The invention is not limited to a specific material for the membrane, the choice of material being dictated by the application. For example, the principle of the invention could be applied to the separation of gas into components, or to the separation of water vapor from air. The invention could also be practiced with various coatings that improve the selectivity of the membrane. These and other modifications, which will be apparent to the reader skilled in the art, should be considered within the spirit and scope of the following claims.

What is claimed is:

1. A gas separation membrane module, comprising:
a) a plurality of hollow fibers formed of a membrane which exhibits selectivity between gaseous components of a feed stream, the module having a feed end and a product end, the fibers extending from the feed end to the product end,
b) the fibers define bores comprising generally straight paths for a feed gas from the feed end to the product end, wherein gas which does not permeate through the fibers and remains within the bores is called a non-permeate gas,
c) the module includes first and second regions, the first region being located in a vicinity of the feed end, the second region comprising a remainder of the module excluding the first region and including a vicinity of the product end,
d) wherein the fibers are coated, in the second region only, with a material which improves selectivity of the membrane, and wherein the fibers in the first region are uncoated,
e) wherein feed gas entering the module first passes through the uncoated fibers and then passes through only the coated fibers for a remainder of its passage through the module, and wherein the non-permeate gas flows only from the feed end to the product end.

2. The module of claim 1, wherein the fibers extend from a first tubesheet at the feed end to a second tubesheet at the product end, and wherein the module includes a baffle which extends from the first tubesheet to the second tubesheet, the baffle having a plurality of openings in a vicinity of the first tubesheet.

3. The module of claim 1, wherein the fibers extend from a first tubesheet at the feed end to a second tubesheet at the product end, wherein the module includes a baffle which extends from the second tubesheet to a vicinity of the first tubesheet, wherein the baffle does not touch the first tubesheet, and wherein the baffle defines an exit path for gas in a vicinity of the first tubesheet.

4. The module of claim 1, wherein the fibers of the module are coated along approximately three-quarters of their length.

5. The module of claim 1, wherein the membrane separates the feed stream into a permeate gas, comprising gas passing through a membrane wall, and a non-permeate gas which leaves the module at the product end, wherein the module includes means for causing the permeate gas to flow in a direction opposite to that of the feed stream.

6. The module of claim 1, wherein the coating material comprises a non-ionic surfactant.

* * * * *